United States Patent
Fletcher et al.

[11] 3,907,686
[45] Sept. 23, 1975

[54] FILTER REGENERATION SYSTEMS

[76] Inventors: James C. Fletcher, Administrator of the National Aeronautics and Space Administration with, respect to an invention of Victor A. DesCamp, Lakewood; Michael W. Boex, Littleton; Michael W. Hussey, Lakewood, all of Colo.; Thomas P. Larson, La Crosse, Wis.

[22] Filed: Aug. 3, 1973

[21] Appl. No.: 385,522

[52] U.S. Cl. ............... 210/259; 210/82; 210/234; 210/304; 210/333; 210/340; 210/411; 210/425; 210/512
[51] Int. Cl.² .......................................... B01D 41/04
[58] Field of Search ......... 209/211; 210/73, 82, 84, 210/234, 247, 259, 300, 304, 333, 340, 341, 393, 411, 425, 427, 440, 489, 493, 499, 512, 167

[56] References Cited
UNITED STATES PATENTS

| | | | |
|---|---|---|---|
| 2,434,427 | 1/1948 | Muller | 210/108 X |
| 2,675,127 | 4/1954 | Layte | 210/493 |
| 3,057,481 | 10/1962 | Pall | 210/493 |
| 3,154,485 | 10/1964 | Liddell | 210/133 X |
| 3,221,888 | 12/1965 | Muller | 210/333 |
| 3,510,890 | 5/1970 | Estabrook | 210/73 X |
| 3,529,724 | 9/1970 | Maciula et al. | 210/512 R |
| 3,599,796 | 8/1971 | Wilhelm | 210/457 |
| 3,675,775 | 7/1972 | Obidniak | 210/333 X |
| 3,698,555 | 10/1972 | Conner | 210/304 X |
| 3,792,773 | 2/1974 | Ross | 210/82 X |
| 3,802,570 | 4/1974 | Dehne | 210/512 R |

*Primary Examiner*—John Adee
*Assistant Examiner*—Robert G. Mukai
*Attorney, Agent, or Firm*—Russell E. Schlorff; John R. Manning; Marvin F. Matthews

[57] ABSTRACT

A system for regenerating a system filter in a fluid flow line where the filter normally retains particulate matter entrained in the fluid flow in one direction is disclosed. The system involves a filter structure in which reverse or back flow through the filter will dislodge particulate matter from a filter element in the filter. Entrained particulate in the fluid back flow is passed to a vortex separator which separates by centrifugal forces and densities, the particulate from the fluid. The cleansed fluid is passed through a separate filter and can be returned to the system. The system for using the separator and separate filter in conjunction with the system filter can take the various forms including: (1) embodiments where an independent pump is employed and the system filter is releasably coupled with separator, the separate filter and the pump in a closed loop, and (2) embodiments where the fluid from the system is diverted by valves to reverse through the system filter and output to the system from the separate filter.

6 Claims, 10 Drawing Figures

FILTER REGENERATION SYSTEMS

ORIGIN OF THE INVENTION

The invention described herein was made in performance of work under a NASA Contract and subject to the provisions of Section 305 of the National Aeronautics and Space Act of 1958, Public Law 85-568 (72 Statute 435; 42 USC 2457).

FIELD OF THE INVENTION

This invention relates to filters in fluid flow systems and systems for regeneration of the filters. The type of filters contemplated by this invention include or require a filter element for straining out particulate matter from fluids. In particular, this invention relates to systems for regenerating or cleaning such filter elements in a fluid flow system without requiring the system to be drained, purged, filled, and bled. The systems of the present invention have specific application to space flight equipment where filters are employed on potable water, process water, thermal water, or freon-21 thermal systems.

DESCRIPTION OF PRIOR ART

Fluid filter design systems frequently present problems where extended use time of filtering elements is required, such as on extending space flights. Similarly, where it is necessary to replace filters, it is often not practical to drain, purge, or refill the system for each filter replacement. Moreover, considering the zero-gravity environment inherent in space flight, filter cleaning and replacement presents some problems in applying what would ordinarily be considered conventional techniques. For example, conventional cleaning systems such as acid baths, ultrasonics, freon, or soap may be too hazardous or complex to be applicable to space craft systems.

One of the objectives of the present invention is to provide a novel system involving a special regenerative filter and a filter regeneration system which may be utilized with no danger to space craft and requires little or no man-time.

SUMMARY OF THE INVENTION

The present invention includes a filter having a porous filter element to trap particulate out of a fluid flow. On the normal outflow side of the filter element is a spray element which does not impede the normal flow of fluid from the filter inlet through the filter element and the spray element to the filter outlet. To regenerate the filter, the normal fluid flow is reversed and the spray element applies a fluid jet to the inner surface of the filter element to dislodge particulate from the filter element and entrain it in the reverse fluid flow. The reverse fluid flow is passed to a vortex separator which separates the fluid and particulate by means of their different densities and the centrifugal forces. The particulate matter is displaced by the fluid motion to a trap where it can be removed from the system, and the cleansed fluids are passed to a separate filter which insures the quality of the fluid which can be returned to the flow system.

The fluid system which has the filter can be arranged with valves and bypass conduits and an alternate filter so that a separator can be releasably coupled to the system and the flow reversed through one filter to trap particulate in the separator while the fluid flow is maintained through the other filter. Alternatively, the alternative filter can be associated with the separator as a separate unit which can be releasably coupled to a system whereby the flow can be reversed through the system filter and the fluid flow can be directed through the filter associated with the separator. In still another form of the system, a pump can be associated with the separator and filter so that a closed loop system can be established with respect to a filter to be cleaned.

DESCRIPTION OF THE PREFERRED EMBODIMENT

Figure 1:
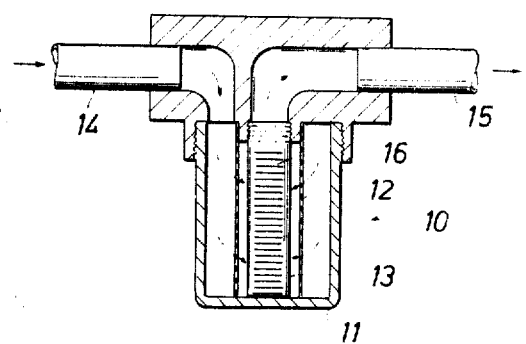
FIG. 1 is a schematic illustration of a regenerative filter.

Referring now to FIG. 1, a regenerative filter 10 is schematically illustrated and consists of a cylindrically shaped hollow filter body or canister 11, a porous, tubular filter element 12 disposed within the body 11, a tubular, slotted back-flush impingement jet means 13 disposed within the filter element 12, an inlet flow conduit 14 to normally pass fluid into the space between the filter body 11 and the filter element 12, and an outlet conduit 15 to normally pass fluid from the interior of the jet means 13 to a system. In normal operation, fluid to be filtered flows into the canister 11 by means of the inlet conduit 14 and passes through the filter element 12. The filter element 12 has a porosity or opening sized to retain particular matter which might be in the fluids so that contaminating particulates contained in the fluid are retained on the outside or exterior surface of the filter element 12. The fluid which passes through the filter next passes through the slotted openings of the tubular back-flush means 13 (which performs no filtering function), and from the interior of the back-flush means 13, the fluid flows to the outlet conduit 15.

The porous filter element 12 is constructed of a stainless steel composite of four different layers of materials consisting of (1) a coarse outer screen or mesh to deflect high velocity particles and minimize impingement with a wire cloth which forms the second layer, (2) a first stage, fine wire cloth woven in a random but controlled matrix, which performs the main filtration function where the cloth has a high particulate holding capacity and high particle removal efficiency, (3) a second stage, woven wire mesh providing a back-up filtration media for additional control of the particle separation, and (4) a coarse, inside screen or mesh. The composite consturction of the above four materials is tubular with longitudinal pleats or folds which provide increased strength and greater surface area. The coarse inside screen also reinforces the pleates to maintain their configuration against high differential pressures in the normal direction of fluid flow.

Extended use of the filter 10 in a fluid flow system eventually results in decreased efficiency as the pores of the filtering layers of the filter element accumulate particulate. The filter 10 of this invention is constructed so that the normal fluid flow can be reversed, i.e., fluid passed into the outlet, through the backflush means 13, the filter element 12, and out of the inlet 14. When the fluid flow is reversed, the back-flush means 13 has slots which cause the fluid to "jet" onto the filter element 12 and to dislodge particulate matter from the filter element.

The back-flush means 13 is a tubular member having horizontal or transverse slots 16 along its length. While slots are illustrated other forms of openings could be used. However, from tests, it has been established that slots with a width of 0.018 inches and 0.050 inches on centers and extended about the circumference, except for two longitudinally and diametrically opposed strips, have been found to be particularly effective for regeneration of a filter with a rating of 10 microns nominal and 25 microns absolute. A flow rate of 10 GPM for 5 minutes (provided that the filter is not loaded to a pressure drop of greater than 22 PSI) has been established as adequate to clean such a filter. In the design of the jet means 13, the slotted configuration provides a high velocity jet which allows the use of lower flow rates and thus decreases the power requirements while providing a high efficiency for the cleaning.

Figure 2:
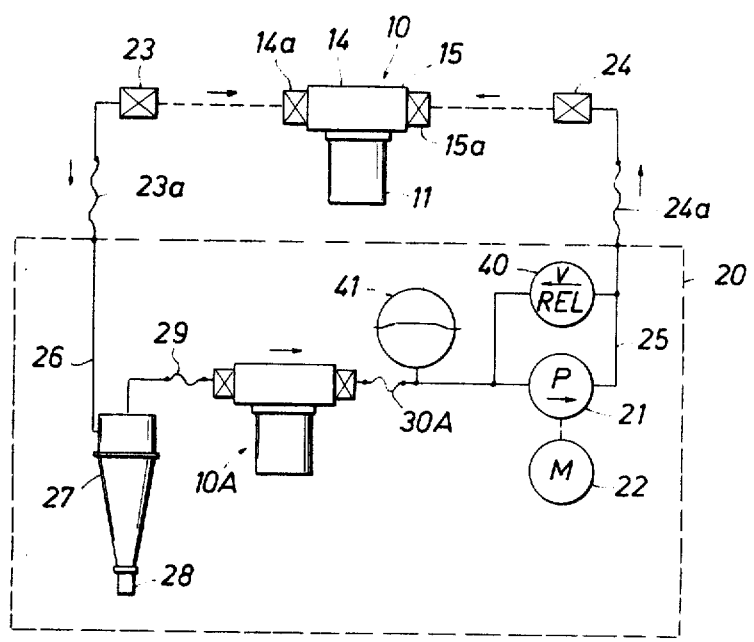
FIG. 2 is a schematic illustration of a filter regeneration unit showing the vortex separator, the secondary filter, the pump, and the pump bypass.

Referring now to FIG. 2, a self-contained regeneration unit 20 for backwashing and cleaning of a filter element 12 is illustrated in schematic form. The filter unit 10 has releasable quick connect-disconnect couplings 14a and 15a so that the filter unit can be removed from a main fluid system and releasably coupled with the regeneration unit 20 for the filter regeneration operation. To regenerate the filter 10, its couplings 14a and 15a can be respectively coupled with the couplings 23 and 24 of the filter regeneration unit 20. The couplings 23 and 24 respectively are connected to a flexible output conduit 23a and a flexible input conduit 24a. When the filter 10 is connected to the open ends of the regeneration unit 20, a closed fluid loop system is formed so that the regeneration unit 20 can force fluid in a reverse direction through the filter element 12, and the particulate, which is dislodged from the filter, can be separated from the fluid in the closed loop. In the regenerative unit, the coupling 23 and conduit 23a are an input to a vortex particle separator 26, the output of the separator 27 in input to a filter 10A, the output of the filter is input to a pump 21, and the output of the pump 21 is to the conduit 24a and coupling 24.

When a filter 10 is coupled to a regenerative unit 20 the pump 21 will output fluid to the filter 10 where the backflush jet means 13 (FIG. 1) can flush particulate from the filter element and entrain such particulate in a fluid flow which is reversed relative to the normal flow of fluid through the filter. The freed particulate is passed by the conduits 23a and 26 to the particle separator 27.

Figure 3:
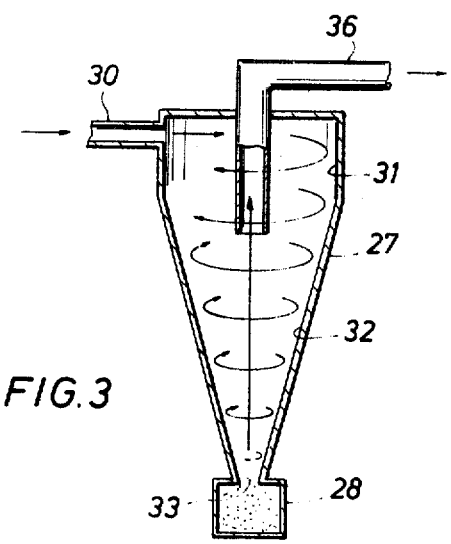
FIG. 3 is a schematic representation of a vortex particle separator.
Figure 4:
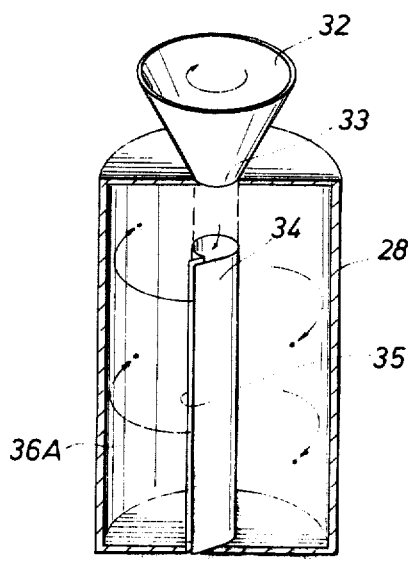
FIG. 4 is a schematic illustration of the separator trap of the particle separator.

Referring now to FIG. 3, the vortex particle separator 27 is a key element in the regeneration cycle. The separator removes particulate of greater density than the fluid centrifugal action. The centrifugal action is induced by swirling the fluid and particulate that is introduced into the separator in a vorticular manner. The fluid input to the separator is provided at its upper end by an inlet 30 which opens tangentially into a cylindrically-shaped upper chamber 31. Below the chamber 31 is a conical chamber 32 which terminates at a lower opening 33. The lower opening 33 is the entrance to a trap 28 where particulate which has been separated from the fluid is accumulated and prevented from reentering the normal flow of fluid. As shown in FIG. 4, the lower opening 33 at the end of the conical chamber 32 opens to a tube 34 which has a longitudinally and tangentially disposed slot 35. Longitudinal extensions on the slot 35 lead away from the tube 34 for a short distance to provide an exit hallway for particulate matter.

As fluid enters the upper chamber 31 of the separator 27, a vorticular motion is induced in the fluid and creates centrifugal forces which cause those particles that are heavier than the fluid in which they are suspended to move toward the outside wall of the upper chamber 31. The lighter fluid which remains in the center of the cylinder can be withdrawn by means of an outlet conduit 36 which is centrally located along the axis of the chamber 31. The outlet 36 depends from the upper surface of the separator and terminates short of the conical chamber 32 so that the fluid can be swirled in the chamber 31 several times before being exited from the separator. The particles that are forced to the walls of the chamber 31 are attracted by the fluid having the vorticular motion in chamber 32 and are eventually forced downward and through the opening 33 into the trap 28. In the trap 28, the circular motion of the fluid will pass the particles through the slot 35 into an outer chamber 36A where the particles are prevented from re-entering the normal flow. The fluid entering the trap 28 throws the suspended particles out through the tangential slot 35 into the chamber 26a such that when the swirling fluid motion in the separator stops, the particle trap prevents the particles from re-entering the separator even in a zero-gravity environment. The trap 28 may be designed for removal or replacement. In testing, it has been found that about 93% of the particulate is separated out and collected in the particle separator trap 28 at the lower end of the separator during a regeneration operation. Any remaining suspended particulate which passes out of the separator 27 is collected in a secondary filter 10A. The secondary filter 10A insures that no fine particles are transmitted to the downstream part of the regnerative filter unit 10 so that particles cannot flow into the system and cause possible contamination failure of the system upon subsequent start-up. The secondary filter 10A can also include flexible couplings and connections 29 and 30A for replacement and for regeneration.

The secondary filter 10A periodically requires maintenance which can be accomplished by means of quick disconnects and flex hoses 29 and 30A. The secondary filter 10A is identical to the regenerative filter 10, thus is interchangeable. The regeneration unit 20 also may be used to regenerate the secondary filter 10A. This is accomplished by placing a spare regenerative filter in the system in place of the normal secondary filter and regenerating the secondary filter.

In the regeneration unit 20, a relief valve 40 is provided to protect the pump 21 and electric motor 22 in the event the unit is operated without a regenerative filter 10 attached. The relief valve 40 is coupled across the inlet and outlet of the pump and will open after a 250 psi differential is directed across it and will provide a short bypass loop to insure flow through the pump when the normal flow path is restricted. Without the relief valve 40 the pump may structurally fail or the motor may overheat causing a shutdown. An accumulator 41 is located in the unit to provide makeup fluid to the system that may be lost when the quick disconnects are disconnected and connected, and also to provide a convenient means of pressurizing the system. The static pressure of the system should range between 20 and 40 psi for good operating results. This can be obtained by pressurizing the accumulator 41 with air to 20 psi and then pressurizing the system with fluid to 40 psi. The accumulator also provides a dampening effect on the pump pulsations (for positive displacement pumps) therefore reducing induced stresses to the components within the unit.

The regeneration system possibilities are many and a number of examples will be given so that the versatility of the systems will become apparent.

Figure 5:
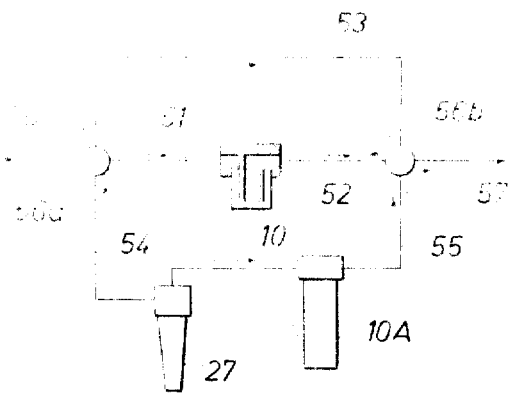
FIG. 5 is a schematic illustration of a permanent installation of a filter regeneration system where flow can be continuously maintained while the system filter is regenerated.

Referring to FIG. 5, a permanent type of filtration system is illustrated which permits automatic regeneration of the filter and further permits a continuous operation of the system even during the regeneration cycle. During the normal filtering operation, the fluid flows through the fluid system inlet 50, into a selector valve 56a through a conduit 51, a filter 10, a conduit 52, a selector valve 56b and is discharged into a fluid system outlet 57 as indicated by the solid arrows. During the normal filtering operation, the selector valves 56a and 57a are oriented such that no flow is permitted into a bypass conduit 53 or the conduits 54 and 55. For regeneration of the filter 10, the selector valves 56a and 56b are operated to divert the flow of incoming fluid into bypass conduit 53 as illustrated by dashed arrows in FIG. 5, and through selector valve 56b into the conduit 52. The flow into the conduit 52 is in a direction reverse that of the normal operational flow. The fluid therefor flows through filter 10 in a reverse direction providing the backflushing and jetting operation which cleanses the accumulated particulate from the filter element 12.

The fluid and particulate flushed from the filter element then flow into the conduit 51, through the selector valve 56a and into the conduit 54 to the vortex particulate separator 27 which separates most of the suspended particulate from the fluid in the manner which has been previously described. Although the vortex separator 27 has a high degree of efficiency, any particulate that is not removed in the separator 27 will be removed as the fluid continues from the separator into the secondary filter 10a. The fluid then passes into the conduit 55 and through selector valve 56b into the fluid system outlet 57 which connects with the main conduit of the fluid system. When the backflushing operation has cleansed the filter 10 to the requisite degree of particulate removal, the selector valves 56a and 56b are oriented or operated to divert the flow of fluid from the path indicated by the dotted arrows to the path indicated by the solid arrows, thus returning the system to the normal operational flow. Since the pressure required to force the fluid in the permanent system is provided by the main pump, this system offers the advantage of not requiring an auxiliary pump during the regeneration cycle.

Figure 6:
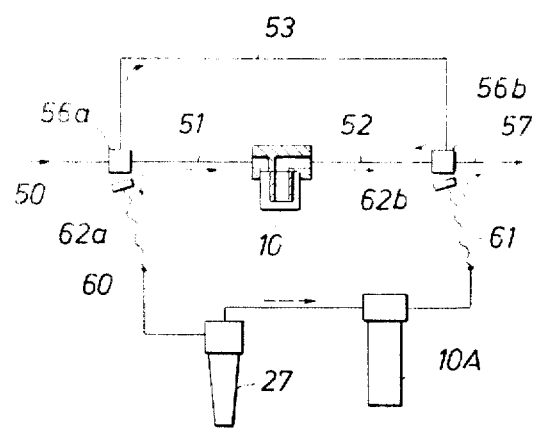
FIG. 6 is a schematic illustration of a portable regeneration unit where the system flow can be maintained while the filter is regenerated.

Referring now to FIG. 6, a portable installation of a filter regeneration unit is schematically illustrated. During the normal filtering operation, the fluid to be filtered passes through the fluid system inlet 50, the selector valve 56a, the conduit 51, the filter 10, the conduit 52, the selector valve 56b and into the conduit 57 as indicated by the solid arrows. When filter regeneration becomes necessary, the regeneration unit may be releasably coupled to the selector valves 56a and 56b by means of releasable couplings 62a and 62b. With the couplings 62a and 62b securely coupled to the selector valves, the valves 56a and 56b are oriented to divert the flow of fluid into bypass conduit 53 in the direction indicated by the dotted arrows and as described above with respect to FIG. 5. The selector valve 56b is oriented to divert the flow from the bypass conduit 53 into the conduit 52 and hence into the filter 10 in a reverse flow from that of the normal operational flow thereby providing the filter cleansing operation previously described. The flow from the conduit 51 passes through the selector valve 56a into the flexible conduit 60 and hence to the vortex separator 27 and secondary filter 10a whose functions have been previously described. The filtered fluid passes from the secondary filter 10a into the flexible conduit 61 through the selector valve 56a into the fluid system outlet 57. When the filter regeneration cycle is completed, the selector valves 56a and 56b are again oriented to provide the normal flow indicated by the solid arrows and the regeneration unit may be removed by uncoupling the couplings 62a and 62b from the valves 56a and 56b. In addition to requiring no additional pump, the portable installation is advantageous in that the regeneration unit may be used to regenerate filters on other systems which involve compatible fluids, thus necessitating only one filter regeneration unit for a number of systems.

Figure 7:
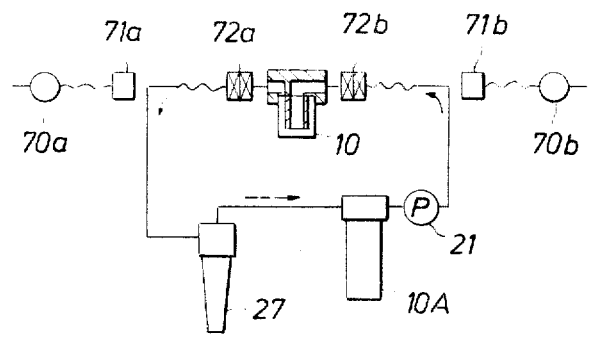
FIG. 7 is a schematic illustration of a portable filter regeneration system with a pump permitting a filter to be connected to the system.

In FIG. 7 a fixed regeneration unit mode of operation is illustrated in which the filter to be regenerated is removed from the operational system and brought to the regeneration unit. To remove the filter from the operational system, the valves 70a and 70b are closed to halt the fluid flow through the system. The filter is then removed from the system by releasing couplings 71a and 71b from the filter and then bringing the filter to the regeneration unit. Although the fluid flow in the system would be interrupted while removing the old filter, a new or previously regenerated filter could be immediately coupled back in the system, reducing down-time to the minimum required to remove the old filter and install a new filter. The filter to be regenerated would then be coupled to the regeneration unit by coupling the releasable couplings 72a and 72b to the filter thus forming a closed-loop system. A pump 21 in the closed-loop system is actuated to force the fluid through the system in the direction indicated by solid arrows. Thus, backflushing and cleansing of the filter of accumulated particulate is accomplished in the closed-loop system by the vortex separator 27 and secondary filter 10a in a manner which has been previously described.

When the regeneration cycle is completed, the filter is removed from the system and may either be stored or replaced in another system.

Figure 8:
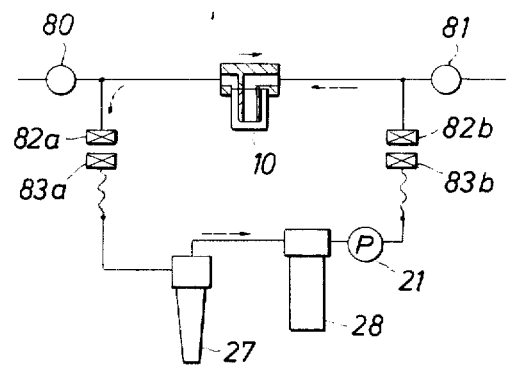
FIG. 8 is a schematic representation of a portable filter regeneration system with a pump which can be releasably connected to a fixed filter system.

FIG. 8 illustrates a configuration in which the regeneration unit is portable and may be brought to the filter 10 when regeneration is required. During normal filtering operation, the system valves 80 and 81 are open and permit a direct flow of fluid through filter 10. When regeneration of the filter of the unit 10 becomes necessary, the valves 80 and 81 are closed to interrupt the flow of fluid through the system. Then the regeneration unit is coupled to the system by releasable couplings 82a and 83a and couplings 82b and 83b thus forming a closed-loop system. The pump 21 in the closed loop system is actuated and forces the fluid through the system in the direction indicated by the dotted arrows and provides a filter cleansing operation in the manner which has been previously described. When the regeneration cycle is completed, the pump 21 is shut off, the couplings 83a and 83b are released from the couplings 82a and 82b and the valves 80 and 81 are again opened to provide normal flow.

Figure 9:
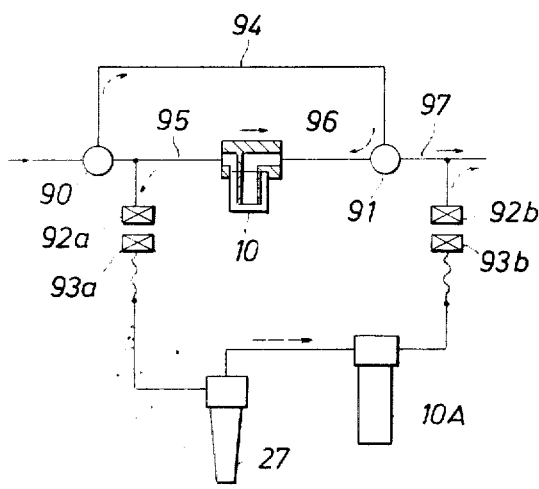
FIG. 9 is a schematic illustration of a permanent installation similar to the installation shown in FIG. 6 but with a different valving arrangement.

In FIG. 9 a portable regeneration system is illustrated in which a bypass conduit 94 is provided instead of a pump to provide for fluid flow. In the normal filter operation, the fluid flows into the system through the selector valves 90, the conduit 95, the filter 10, the conduit 96, the selector valve 91, and the conduit 97, in the direction indicated by the solid arrows. When filter regeneration becomes necessary, the portable regeneration unit is brought to the filter and attached to the system by attaching the couplings 92a and 93a and the couplings 92b and 93b. The selector valve 90 is then oriented to divert the flow of fluid into the bypass conduit 94 and the selector valve 91 is oriented to divert the flow into the conduit 96 in the direction indicated by the dotted arrows. The flow through the filter 10 is in a reverse direction to that of normal flow providing a back-flush of the filter. The fluid flows to the conduit 95 and through the couplings 92a and 93a to the vortex separator 27 and secondary filter 10A which function in the manner previously described. The fluid flow is out of the regeneration unit in the direction indicated by the dotted arrows. When the regeneration of the filter is completed, the selector valves 90 and 91 are again oriented to provide fluid flow in the normal direction previously described and the portable regeneration unit may be released from the couplings, and removed, and stored.

Figure 10:
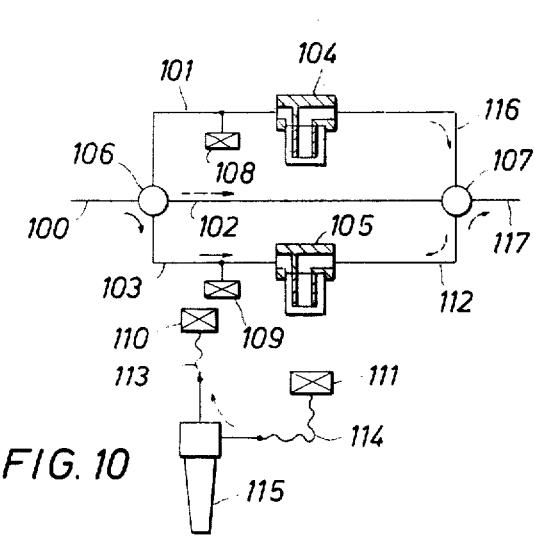
FIG. 10 is a schematic illustration of a continuous, permanent system which has alternate filters and a detachable separator for use in regeneration of a filter.

Referring now to FIG. 10 a simplified unit is schematically illustrated which allows continuous system operation and which permits a reduction in the number of components in the regeneration unit by elminating the need for a separate pump in the regeneration unit. During the normal filtering operations as illustrated in FIG. 10, the selector valves 106 and 107 are oriented to provide a flow of fluid through either conduit 101 to the filter 104 or through the conduit 103 to the filter 105, or if necessary, the selector valves may be oriented to provide simultaneous flows through conduits 101 and 103 such that both filters 104 and 105 provide a filtering function.

When regeneration of filter 105 becomes necessary, the regeneration is brought to the filter system and coupled to the system by coupling of releasable coupling 110 to coupling 108 and coupling 111 to coupling 109. The selector valve 106 is oriented to provide the entire flow of fluid into conduit 102 and the selector valve 107 is oriented to direct the fluid flow into conduit 112, as illustrated by the broken arrows in FIG. 10. Thus, it will be appreciated that the flow of fluid to filter 105 is in the reverse direction to that of normal filtered flow, Thus providing the filter cleansing operation as previously described. The fluid and removed particulate flow through couplings 109 and 111 in the flexible conduit 114 to the vortex separator provides a primary separation for the particulate. The separated fluid then flows through flexible conduit 113 to the couplings 110 and 108 and enters conduit 101 and then into filter 104. It will be appreciated in this schematic illustration that no secondary filter is required in the regeneration unit as this function is provided by filter 104. The fluid thus flows into conduit 116 and to outlet conduit 117 through selector valve 107. With the regeneration of filter 105 complete, the selector valve 106 is oriented to direct the flow of incoming fluid from conduit 100 into conduit 103 and the selector valve 107 is oriented to direct the flow of fluid from the conduit 112 into the outlet conduit 117. The regeneration unit may then be removed by releasing the couplings 110, 108, 111, and 109 from one another. If the regeneration of the filter 104 is required, the regeneration unit is coupled to the system by coupling releasable coupling 110 to coupling 111 to coupling 108. The selector valve 106 is then oriented to direct the flow of fluid from the incoming conduit 100 to the conduit 102. The selector valve 107 is oriented to direct the fluid from the conduit 102 into the conduit 116 such that the fluid will pass into the filter 104 in a direction reverse that of the normal flow thus providing a backwashing and cleansing operation as has previously been described. The fluid and removed particulate then pass through couplings 108 and 111 to the flexible conduit 114 to the vortex separator, through the conduit 113 to the filter 105 (which provides the secondary filtering function), into the conduit 112, and through the valve 107 which is oriented to direct the flow of fluid into outlet conduit 117. When regeneration of the filter 104 is complete, the selector valves 106 and 107 are oriented to direct the fluid flow through the filter 105 and the regeneration unit may the be disconnected by releasing couplings 111, 108, 110, and 109.

The foregoing described filter systems reduce the down-time of a system for filter cleaning, eliminates the need to bleed and purge the system and elminates spillage. The systems have particular application to water, coolant, and freon systems of space crafts, but can be applied to other systems requiring frequent filter changes such as coolant, hydraulic, and fuel systems for aircraft. It also has application to continuous processing systems where down-time and maintenance must be kept to a minimum or for systems where maintenance is hazardous, such as a fluid contaiminated with radioactive materials. Other applications include hydraulic systems on machinery, fluid coolant and lubrication systems in machining process, paper mills where large quantities of water are used, milk process and filtering stations, and any industrial fluid systems where filtering processes are conducted.

The system may also be used on swimming pool recirculating systems. Present systems use sand filter beds 8 feet in diameter and ten feet high. Typically two of these filter beds are used and they use a backflush to clean them. The effluent is flushed down the sewer. The regenerator system described here would reduce equipment sizes, shelter buildings, water loss in the process, and could be automatic.

Further modifications and alternative embodiments will be apparent to those skilled in the art in view of this description, and, accordingly, the foregoing specification is considered to be illustrative only.

What is claimed is:

1. A fluid filter regeneration system comprising
a fluid system having an input line and an output line and bidirectional input valve means and bidirectional output valve means, connected respectively to said input line and said output lines,
first, second, and third flow lines extending between said input valve means and said valve means,
a regenerative fluid filter in the first flow line,
a separator means for separating particulate matter from a flow of fluid by a vorticular motion in the second flow line,
the third flow line connected between said input valve means and said output valve means,
said input valve means being operable in a first position for connecting said first flow line to the system input line and in a second position for connecting said third flow line to the system input line, and connecting said first flow line to the second flow line,
said output valve means being operable in a first position for connecting said first flow line to a system output line and in a second position for connecting said third flow line to the first flow line thereby directing flow in reverse direction through the first flow line for reversing fluid flow through the regenerative filter means in said first flow line and for connecting said second flow line to the system output line,
said input valve means and said output valve means constructed and arranged such that when the input valve means is in the first or second position, the output valve means is also in the same position so that when the valves are in the first position, flow is directed from the system input line through the first flow line to the system output line and when the valves are in the second position, flow is from the system input line through the third flow line then in a reverse direction through the first flow line, then through the second line and then the system output line.

2. The system specified in claim 1 including the second line being connectable to the input and output valve means by disconnect releaseable coupling means.

3. A fluid filter regeneration system comprising
a system inlet flow means, a system outlet flow means,
regenerative means formed of body means defining an enclosed fluid chamber, inlet flow means to said chamber in selective fluid communication with the system inlet flow means, an outlet flow means to said chamber, in selective communication with the system inlet flow means and system outlet flow means, means in said body means defining a porous filter wall surface sized to filter particulate from fluid, said wall surface separating said enclosed chamber into inner and outer spaces, said inlet flow means being coupled to said outer space, said outlet flow means being coupled to said inner space, thereby permitting fluid flow from said inlet flow means into said outer space, through said wall surface into said inner space and from said inner space to said outlet flow means, jetting means disposed in said inner space along the interior of said wall surface and coupled to said outlet flow means, said jetting means comprising a tubular member concentrically arranged relative to said wall surface and having narrow transverse slots along its length said slots constructed and arranged for normally passing fluid without undue restriction when said fluid flow is from said inlet to said outlet flow means and for jetting fluid under pressure onto said wall surface when said fluid flow is from said outlet to said inlet flow means;

particle separator means in selective communication with the inlet of the regenerative filter means, said separator including a hollow body having a cylindrically formed upper chamber, an adjoining, conically tapering chamber and a lower trap chamber which contains a tubular member, having an opening in spaced communication with the conically tapering chamber and further having a longitudinally extending, tangentially disposed opening;

inlet means to said separator means disposed tangentially to the upper end of said upper chamber, and outlet means comprising a tubular member disposed along the axis of said upper chamber and having its opening disposed below the tangential inlet means and above the bottom of the conically tapering chamber; and an additional filter means coupled to said separator means, said additional filter means having an inlet in fluid communication with the outlet of said particle separator means and an outlet in selective fluid communication with the system outlet flow means;

whereby reverse flow through the regenerative filter means backwashes the regenerative filter means thereby cleaning particulate matter from said wall surface, the particulate matter being then separated from the fluid by vorticular motion in the particle separator and minute matter being removed by the additional filter.

4. A fluid regeneration system for use with a fluid system having a system filter means which can be regenerated by a reverse flow of fluid through the system where the reverse fluid flow carries particulate matter from the system filter means in suspension in the fluid comprising;

the system filter means being located in a flow line of the fluid system,
a pair of bidirectional valve means, one located in the flow line upstream and one located in the flow line downstream of the system filter means, a first fluid conduit between said bidirectional valve means,
a second fluid conduit in fluid communication with the flow line of the fluid system,
separator means in said second fluid conduit for receiving the reverse flow of fluid and particulate matter from said system filter means and for separating such particulate matter from the fluid by a vorticular motion, and secondary filter means in said second fluid conduit means coupled to the outlet of said separator means for receiving the fluid output from said separator means and for filtering said fluid to trap any particulate matter not separated out from the fluid in the separator means, whereby said pair of bidirectional valve means are selectively operable between a first position for passing fluid in one direction through said system filter means and in a second position for passing fluid through said first fluid conduit, in a reverse direction through said system filter means and then through the separator means and secondary filter means in said second fluid conduit.

5. The fluid regeneration system as defined in claim 4 and further including the flow line having releasable coupling means and the ends of the second conduit having mating releasable coupling means for detachably connecting said separator means and said secondary filter means to the flow lines.

6. The fluid regeneration system as defined in claim 5 wherein the releasable coupling means in the flow line for connecting with the mating releasable coupling means for the output of the second conduit is on the downstream side of the bidirectional valve located downstream of the system filter means.

* * * * *